United States Patent
Perniciaro

(10) Patent No.: US 7,255,386 B1
(45) Date of Patent: Aug. 14, 2007

(54) VEHICLE COVER AND METHOD OF COVERING A VEHICLE

(76) Inventor: Joseph Perniciaro, 2312 Kingstowne Place Ct., Wildwood, MO (US) 63011

( * ) Notice: Subject to any disclaimer, the term of this patent is extended or adjusted under 35 U.S.C. 154(b) by 3 days.

(21) Appl. No.: 11/358,802

(22) Filed: Feb. 21, 2006

(51) Int. Cl.
*B60J 7/20* (2006.01)

(52) U.S. Cl. .......................... 296/136.08; 296/136.01; 296/136.1

(58) Field of Classification Search ........... 296/136.08, 296/136.01, 136.1, 136.11
See application file for complete search history.

(56) References Cited

U.S. PATENT DOCUMENTS

| | | | | |
|---|---|---|---|---|
| 1,728,437 A * | 9/1929 | Mott | ....................... | 296/136.1 |
| 2,465,621 A * | 3/1949 | Wheeler | ................ | 296/100.15 |
| 3,588,169 A * | 6/1971 | Lunt | ........................ | 296/95.1 |
| 4,294,483 A * | 10/1981 | Ferris | .................... | 296/136.02 |
| 4,406,320 A * | 9/1983 | Bingham | ............... | 160/370.21 |
| 4,597,608 A * | 7/1986 | Duffy | ........................ | 296/95.1 |
| 4,635,996 A * | 1/1987 | Hirose | ................... | 296/136.07 |
| 4,739,528 A * | 4/1988 | Allen | .................... | 296/100.15 |
| 4,925,234 A * | 5/1990 | Park et al. | ............ | 296/136.13 |
| 4,972,892 A | 11/1990 | Yeh | | |
| 5,035,460 A * | 7/1991 | Huang | ...................... | 296/95.1 |
| 5,401,074 A * | 3/1995 | Timerman | ............ | 296/136.02 |
| 5,497,819 A | 3/1996 | Chiang | | |
| 5,615,923 A | 4/1997 | Madison | | |
| 5,738,403 A | 4/1998 | Tyson | | |
| 5,890,525 A * | 4/1999 | Shores | ................... | 296/136.02 |
| 5,927,793 A | 7/1999 | McGrath, Jr. | | |
| 6,070,629 A * | 6/2000 | Whiteside | .............. | 296/136.02 |
| 6,199,932 B1 | 3/2001 | Welsh et al. | | |
| 6,352,299 B1 | 3/2002 | Ames et al. | | |
| 6,485,086 B2 * | 11/2002 | McGrath, Jr. | .......... | 296/136.13 |
| 6,517,141 B1 * | 2/2003 | Su | .......................... | 296/136.1 |
| 6,561,257 B2 | 5/2003 | Huang | | |
| 6,779,827 B2 * | 8/2004 | Clark | .................... | 296/136.01 |
| 7,182,391 B2 * | 2/2007 | Thrasher et al. | ....... | 296/136.02 |
| 2002/0105207 A1 | 8/2002 | McGrath, Jr. | | |
| 2005/0139300 A1 | 6/2005 | Harmon | | |
| 2005/0247415 A1 | 11/2005 | Conforti | | |

* cited by examiner

*Primary Examiner*—Kiran B. Patel
(74) *Attorney, Agent, or Firm*—Polster, Leider, Woodruff & Lucchesi, L.C.

(57) ABSTRACT

A protective cover and method of covering. The protective cover fastens to a frame of a vehicle while covering portions of the vehicle. The cover comprises a sheet having substantially the general dimensions of the vehicle portions. The sheet has a front, a rear and sides which cover the portions of the vehicle. The sheet further comprises a plurality of fastener assemblies attached to the sheet, each fastener assembly having a fastener sheet member, a fastener connector and a bias member. The fastener sheet member is integrally formed with the sheet, the bias member removeably fastens to the frame of the vehicle and the fastener connector connects the fastener sheet member to the bias member in order to fasten the sheet to the frame of the vehicle. The cover further comprises a plurality of tension assemblies attached to the sheet, each tension assembly having opposing tension sheet members and a connector wherein the connector adjustably connects the tension sheet members in order to reciprocally move the tension sheet members thereby adjusting the tension of the sheet when the sheet is attached to the frame by the plurality of fastener assemblies.

13 Claims, 5 Drawing Sheets

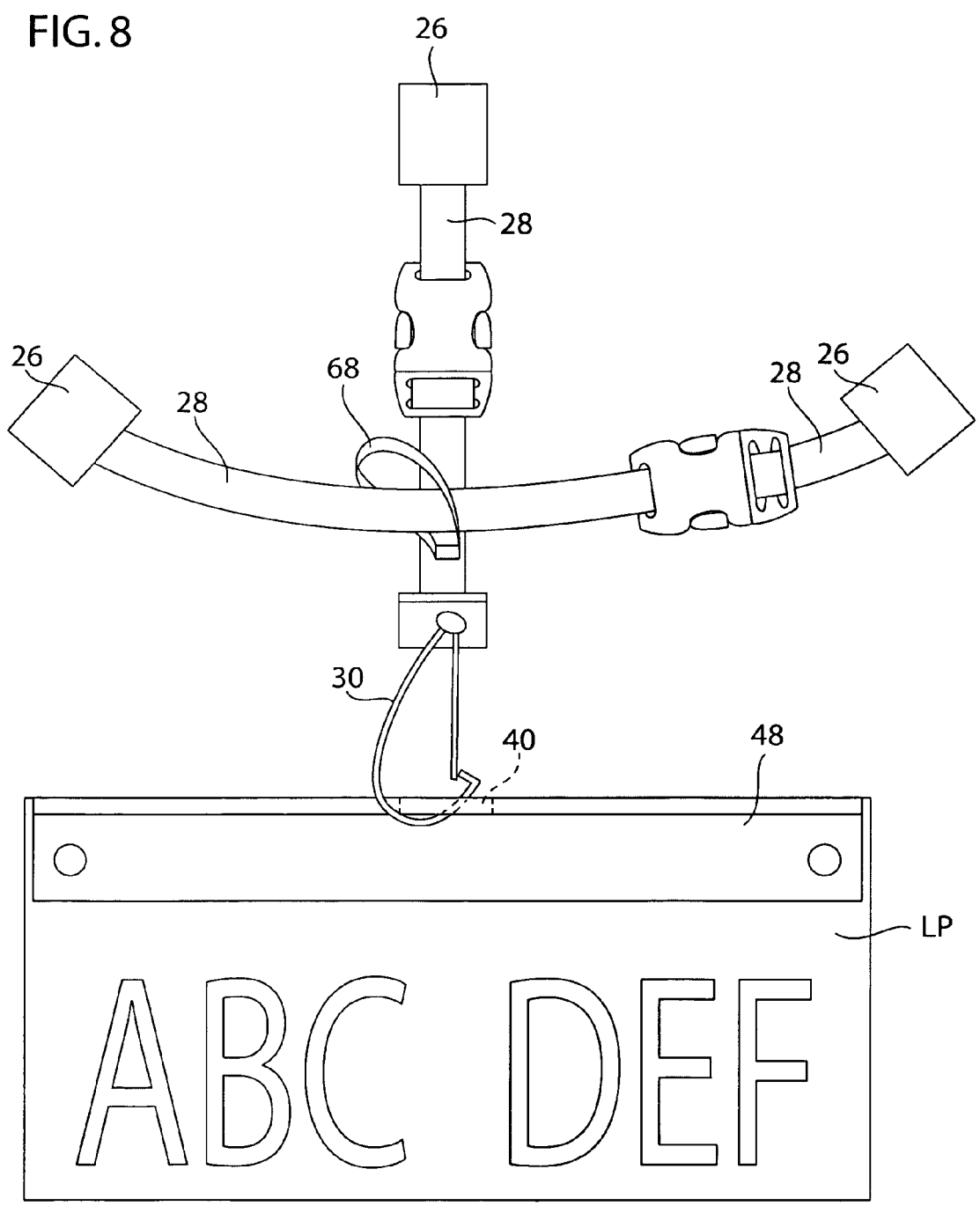

VEHICLE COVER AND METHOD OF COVERING A VEHICLE

CROSS-REFERENCE TO RELATED APPLICATIONS

Not Applicable.

STATEMENT REGARDING FEDERALLY SPONSORED RESEARCH

Not Applicable.

BACKGROUND OF THE DISCLOSURE

The present disclosure relates to an apparatus that covers portions of a vehicle, and in particular, the present disclosure relates to an all season cover suitable for adjustably covering vehicle portions in order to protect the vehicle portions from various environmental effects.

Vehicles, when positioned unprotected and outside, experience environmental effects applied to the exterior and the interior of the vehicle. These vehicles, during cold and stormy weather, particularly when parked for extended periods, accumulate snow and ice when the weather produces snow, rain or sleet during freezing temperatures. Such accumulations impair the visibility of the driver resulting in unsafe driving conditions. Furthermore, sunlight damages upholstery, dashboards and steering wheels, causing these components to fade, dry out or crack while building up heat within the interior of the vehicle.

Removing ice and similar accumulations from the vehicles is often very difficult to achieve within a reasonable time. Accordingly, it is desirable to prevent the occurrence of such accumulations in the first place. Additionally, maintaining the interior of the vehicle free from exposure of ultra violet light is desirable to prevent damaging conditions to the upholstery and components of the vehicle and to prevent uncomfortable conditions when the occupant enters the vehicle. Other environmental hazards that are desirable to avoid include dust, dirt and debris accumulating on vehicle windows, wiper blades, door handles and keyholes.

Vehicle covers have been developed to protect vehicles from environmental conditions. Current covers are either too complicated or expensive and in most instances have been too difficult and time consuming to install to permit their wide-spread adoption and use. Some covers are full body covers, that is, covers which envelope or cover an entire vehicle body. A full body cover can be awkward and unwieldy to install. Additionally, positioning and maintaining a full body cover on the vehicle can be difficult during inclement weather. In particular, a full body cover must generally be exactly shaped to conform to the vehicle body in order to avoid unsightly bulges and to keep from being blown off the vehicle by wind. Some covers use a crimped ring to hold the full body cover to the car but this ring loses its retraction force over time, resulting in the cover lifting away from the vehicle to expose the vehicle. Some covers use hooks; but these hooks are not adjustable to adequately connect with different vehicle frames. Other covers are designed specifically to cover only the window shield or cab area of the vehicle. Cab covers typically comprise a semi-rigid or rigid frame that increases the set up/removal time and effort of applying the cab cover. Furthermore, existing covers are not adjustable with respect to tension of the cover when the cover is placed on the vehicle.

SUMMARY OF THE DISCLOSURE

The present disclosure relates to a protective cover for vehicles that can be adjusted for tension when fastened to the vehicle. The disclosure comprises a protective cover that fastens to a frame of a vehicle while covering portions of the vehicle. The cover comprises a sheet having substantially the general dimensions of the vehicle portions, wherein the sheet has a front, a rear and sides that cover the vehicle portions.

The cover further comprises a plurality of fastener assemblies attached to the sheet, each fastener assembly having a fastener sheet member, a fastener connector and a bias member such that the sheet member is integrally formed with the sheet. The bias member removeably fastens to the frame of the vehicle while the fastener connector connects the sheet member to the bias member in order to fasten the sheet to the frame of the vehicle.

Additionally, the cover comprises a plurality of tension assemblies attached to the sheet. Each tension assembly has opposing tension sheet members and a connector. The connector adjustably connects the tension sheet members in order to reciprocally move the tension sheet members, thereby adjusting the tension of the sheet when the sheet is attached to the frame by the plurality of fastener assemblies.

The foregoing and other objects, features, and advantages of the disclosure as well as presently preferred embodiments thereof will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 8 is a partial elevational view showing the bracket of FIG. 7 and the pair of connected fastening assemblies of FIG. 6 that fasten the protective cover to the vehicle.

Corresponding reference numerals indicate corresponding parts throughout the several figures of the drawings.

DESCRIPTION OF THE PREFERRED EMBODIMENT

The following detailed description illustrates the disclosure by way of example and not by way of limitation. The description clearly enables one skilled in the art to make and use the disclosure, describes several embodiments, adaptations, variations, alternatives, and uses of the disclosure, including what is presently believed to be the best mode of carrying out the disclosure.

Figure 1:
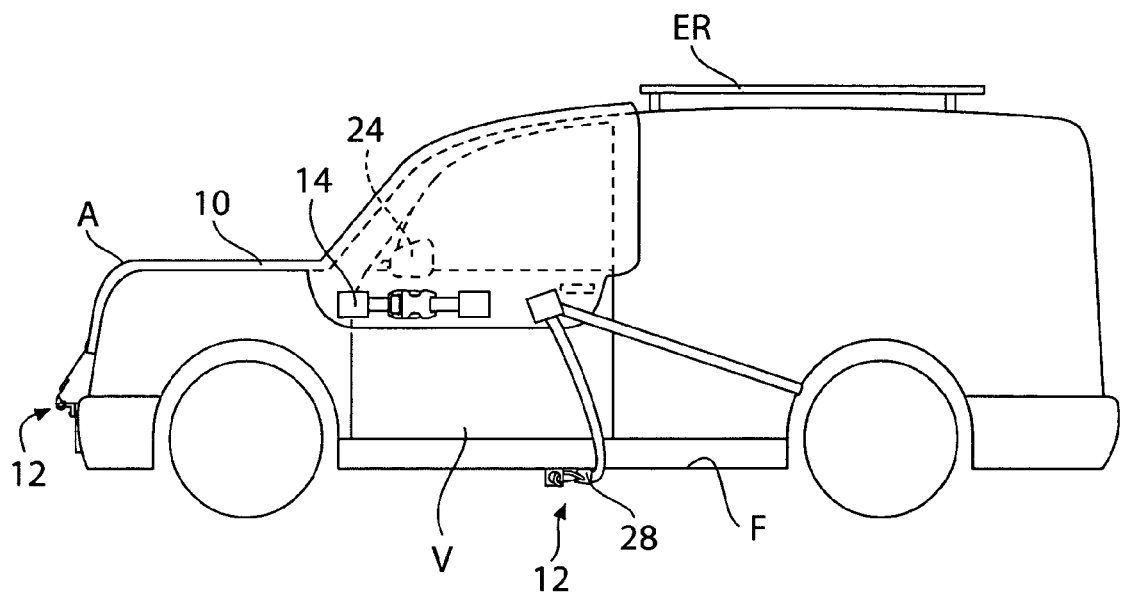
FIG. 1 is a side elevational view of the protective cover constructed in accordance with and embodying the present disclosure showing the protective cover fastened to a frame of a vehicle in the form of a van.

Referring to the drawings, a protective cover A fastens to a frame F of a vehicle V while covering portions of the vehicle V (FIG. 1). The frame F includes that part of the vehicle having an edge. The frame F may include but is not limited to body portions and unibodies. In one embodiment, the protective cover A comprises a unitary sheet 10 having a symmetrical configuration. In another embodiment, the protective cover A comprises a sheet 10 having substantially the general dimensions of the vehicle portions to be covered. The protective cover A also comprises a plurality of fastener assemblies 12 and a plurality of tension assemblies 14.

In the illustrative embodiment, the protective cover A shields portions of the vehicle V, shown in the form of a van. These portions include the grill, the hood and cab of the van. As such, the protective cover A shields these portions from the environment while allowing access to other portions of the van such as the cargo door or equipment rack ER. In one embodiment (not shown), the sheet 10 covers the door and/or front quarter panels of the van.

The sheet 10 comprises a heatproof and waterproof material. Examples of such materials include nylon and polycotton. The sheet 10 also resists ultraviolet light, wherein the sheet includes UV-resistant materials such as polypropylene fabrics. The sheet 10 may also consist of multiple layers of material with various capabilities, such as softness and identification (i.e. a unique visual pattern). The all weather exterior protection of the sheet 10 shields vinyl interiors, leather interiors and dashboards of the vehicle V from cracking and fading from the sun's heat and ultraviolet rays as well as shielding windows and windshield from snow, ice and frost buildup, therefore eliminating scraping of these elements. The sheet 10 further shields portions besides the windows and windshield from weather elements and debris.

Figure 2:
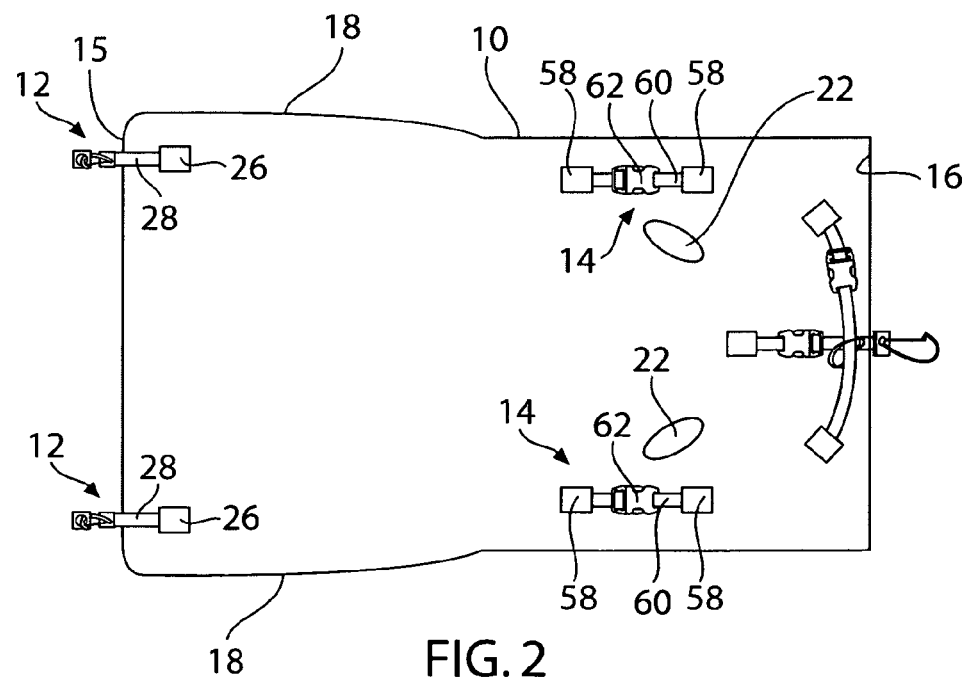
FIG. 2 is a plan view of a protective cover showing a plurality of fastener assemblies and tension assemblies constructed in accordance with and embodying the present disclosure.

The sheet 10 has a front 15, a rear 16 and sides 18 which are configured to cover corresponding portions of the vehicle V (FIG. 2). The sheet 10 also includes mirror pockets 22 for enclosing the side-view mirrors 24 of the vehicle V. The sheet 10 comes in a variety of adjustable sizes for compact, small, medium and large automobiles, vans, trucks and boats.

As shown, the fastener assemblies 12 attach to the sheet 10 at a plurality of locations. For example, one fastener assembly 12 may connect to the underside frame of the vehicle V. Another fastener assembly 12 may connect to the wheel well of the frame F. These assemblies 12 may be used alone or in combination with one another. Each fastener assembly 12 comprises a fastener sheet member 26, an adjustable belt 28, a fastener connector 30 and a bias member 32. In one embodiment, the fastener sheet member 26 comprises a segment of material integrated with the sheet 10. This segment of material may include the same material composition as the sheet 10. The fastener sheet member 26 may be stitched or sealed to the sheet. In one embodiment, the fastener sheet member 26 may comprise a portion of the sheet 10.

Figure 3:
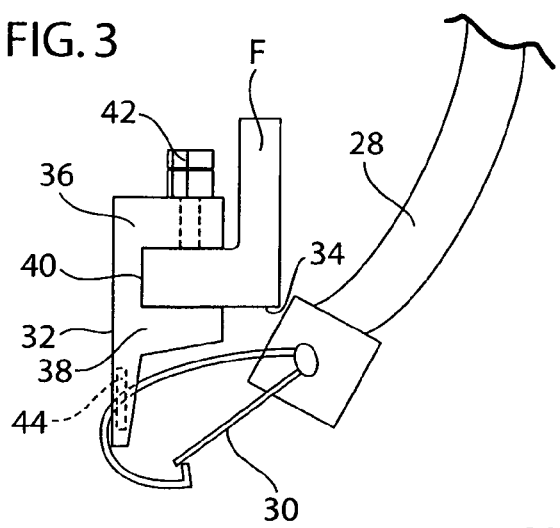
FIG. 3 is a partial elevational view showing a bias member of the fastener assembly fastened to a portion of the frame of the vehicle in a vertical position.
Figure 3A:
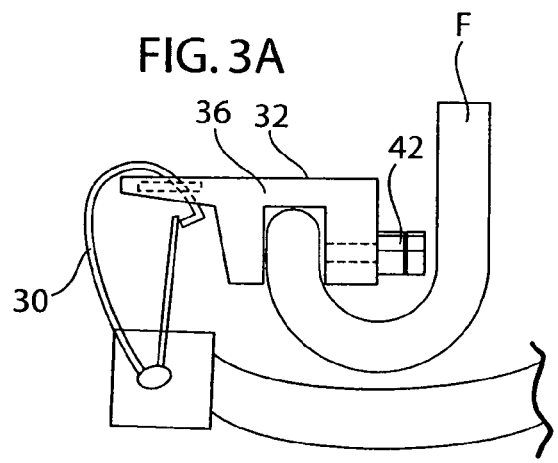
FIG. 3A is a partial elevational view showing a bias member of the fastener assembly fastened to the frame of the vehicle in a horizontal position.
Figure 3B:
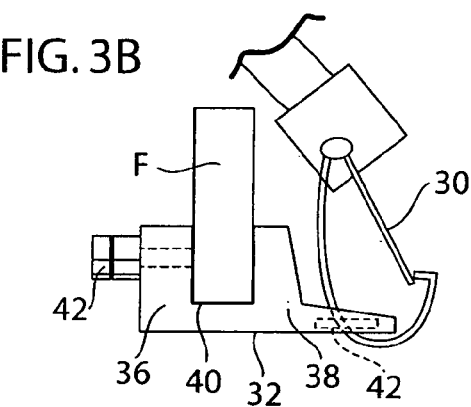
FIG. 3B is a partial elevational view showing a bias member of the fastener assembly fastened to a frame of the vehicles in another horizontal position.

As shown in FIGS. 2 and 3-3B, the adjustable belt 28 connects the fastener sheet member 26 to the fastener connector 30. In one embodiment, the fastener connector 30 comprises a C-clasp (FIGS. 3-3B). The belt 28 adjusts the position of the fastener connector 30 with respect to the fastener sheet member 26 in order to adjust the length between the fastener connector 30 and the fastener sheet member 26 so that the fastener connector 30 can engage the bias member 32. As shown, the bias member 32 attaches to the underside portion 34 of the frame F of the vehicle V in a vertical position. In another embodiment, the bias member 32 attaches to the frame F of the vehicle V in a substantially horizontal position (FIG. 3A). In this embodiment, the portion of the frame F may include the wheel well of the vehicle V. In another embodiment, the bias member 32 attaches to the frame F of the vehicle V in a horizontal position (FIG. 3B).

The bias member 32 is configured to removably fasten to the frame F of the vehicle V. In one embodiment, the bias member 32 comprises an adjustable clamp 36. In this embodiment, the clamp 36 includes a body 38 having a channel 40, a fastener 42 such as a screw and an aperture 44 defined through the body 38. As shown, the channel 40 engages with the frame F of the vehicle V while the fastener 42 maintains the clamp 36 against the frame F. As such, the bias member 32 is adjustable to connect with a variety of sizes and configurations of the frame F. The fastener connector 30 engages the aperture 44 of the body 38 in order to fasten the sheet 10 (FIG. 1) to the frame F of the vehicle V. As shown in FIG. 3, the aperture 44 extends below and/or the frame F to provide convenient access for the user to engage the fastener connector 30. Furthermore, the bias member 32 remains fastened to the vehicle frame F whether or not the fastener connector 30 engages with the bias member 32.

Figure 4:
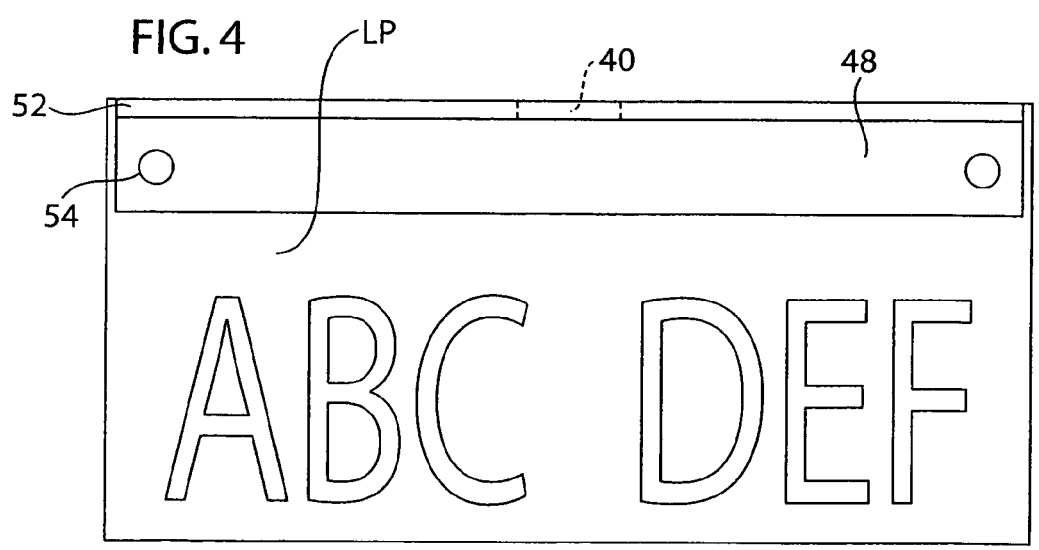
FIG. 4 is a partial elevational view showing a bracket of the fastener assembly attached to a license plate of the automobile.
Figure 6:
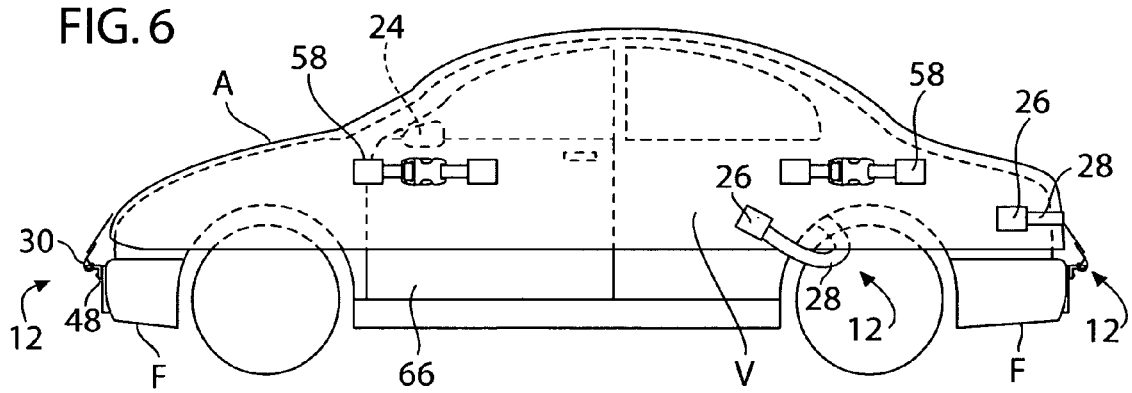
FIG. 6 is a side elevational view of the protective cover constructed in accordance with and embodying the present disclosure showing the protective cover fastened to a frame of a vehicle in the form of an automobile and showing one of a pair of fastening assemblies connected to each other across the rear of the automobile.
Figure 7:
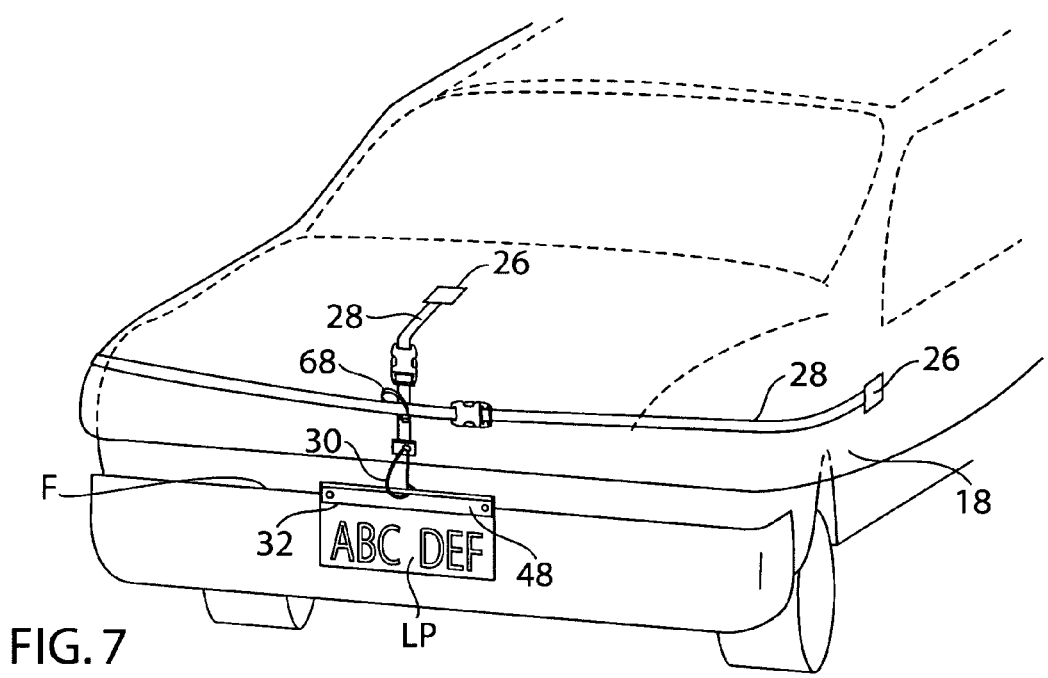
FIG. 7 is a rear elevational view of FIG. 6 showing the bracket of the fastener assembly attached to the frame of the vehicle and showing the pair of fastening assemblies connected to each other across the rear of the automobile.

At least one of the fastener assemblies 12 further comprises a bracket 48 that is configured to removably attach to the frame F of the vehicle V (FIG. 4). In one embodiment, the bracket 48 comprises an L-shaped member 52 having apertures 54 defined therethrough. As shown in FIGS. 6, 7 and 8, the fastener connector 30 of the fastener assembly 12 removably attaches to the L-shaped member 52 such that the channel 40 engages in the L-shaped member 52 and the fastener 42 maintains the clamp 36 against the L-shaped member 52. In this embodiment, the bracket 48 removably attaches to the frame F at the license plate LP. The apertures 44 of the bracket 48 align with the fastener holes of the license plate LP. Thus, the fastener (i.e. screw) of the license plate LP also fastens the L-shaped member 52 to the vehicle V frame F. As such, the bracket 48 attaches to the license plate LP without inputting additional holes into the frame F and/or damaging the frame F.

As previously noted, the tension assemblies 14 attach to the sheet 10 at a plurality of locations (FIG. 2). Each tension assembly 14 comprises opposing tension sheet members 58, adjustable belts 60 and a connector 62. In one embodiment, the tension sheet member 58 comprises a segment of material integrated with the sheet 10. This segment of material may include the same material composition of the sheet 10. The tension sheet member 58 may be stitched or sealed to the sheet 10. In one embodiment, the tension sheet member 58 may comprise a portion of the sheet 10.

The connector 62 of the tension assembly 14 adjustably connects opposing tension sheet members 58. In one embodiment, the connector 62 comprises a buckle that adjusts the positions between the opposing tension sheet members 58. As such, the connector 62 adjustably connects the tension sheet members 58 in order to reciprocally move the tension sheet members 58 thereby adjusting the tension of the sheet 10 when the sheet 10 is attached to the frame F by the plurality of fastener assemblies 12. In one embodiment, tension assemblies 14 attached to the side of the sheets 10 are positioned adjacent to the side-view mirror 24 in order to adjust the tension near the middle of the sheet 16. In another embodiment, the tension assemblies 14 are attached near the rear of the sheet 10 in order to adjust the tension near the rear of the sheet 10.

During operation, the user installs the bias members 32 of the fastener assemblies 12 by attaching them to the frame F. The user easily slips the channel 40 of the clamp 36 around the frame portion and adjusts the fastener 42 (FIGS. 3-3A). In this position, the aperture 44 of the bias member 32 extends below the frame F to allow convenient access for the fastener connector 30. In this position, the frame F of the vehicle V hides most of the bias member 32 from view. As such, the user can initially fasten the bias members 32 and can let the bias members 32 remain fastened to the vehicle V at all times thereafter, whether or not the sheet 10 is attached. Since the frame F visually blocks most of the bias member 32, the positioning of the bias member 32 eliminates any unpleasant visual aspect for the vehicle V.

Similarly, the user installs the bracket 48 of at least one of the fastener assemblies 12 to the frame F via the license plate LP (FIGS. 1 & 7). The user can easily fasten the fastener connector 30 to the bracket 48 attached to the license plate LP. The position of the bracket 48 allows an unhindered view of the license plate indicia.

Once the bias members 32 and bracket 48 are attached to the frame F, the user can conveniently and with minimal effort spread the sheet 10 over portions of the vehicle V. Once positioned on the vehicle portions, the user extends the belts 26 of the fastener assemblies 12 to position the fastener connectors 30 in engagement with the respective bias members 32. As such, the plurality of fastener assemblies 12 fastens the sheet 10 to the frame F of the vehicle V.

The user then connects the opposing tension sheet members 58 by the connector 62 of the tension assemblies 14. Based on the desired tightness of the sheet 10 against the vehicle portions, the user then adjusts the belts 60 of the tension assemblies 14 via the connector 62 in order to reciprocally move (i.e. retract or extend) the tension sheet members 58, thereby adjusting the tension of the sheet 10 when the sheet 10 is attached to the frame F by the plurality of fastener assemblies 12. As shown in FIG. 1, the tension assemblies 14 are positioned adjacent and below the pockets 22 for the side-view mirrors 24. This position allows tension adjustment near the midpoint of the sheet 10. Other positions of the tension assemblies 14, however, may be used.

Figure 5:
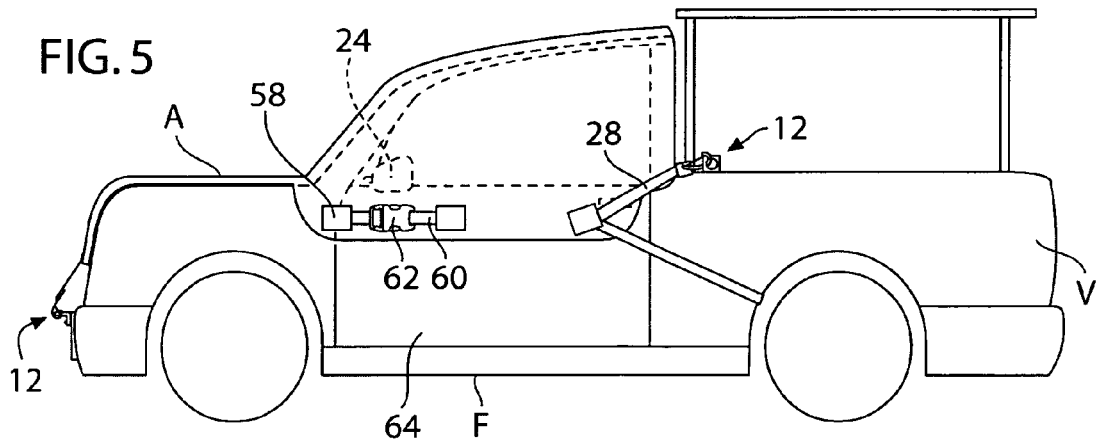
FIG. 5 is a side elevational view of a protective cover constructed in accordance with and embodying the present disclosure showing the protective cover fastened to a frame of a vehicle in the form of a truck.

In another embodiment, the protective cover A shields portions of a vehicle V in the form of a truck 64 (FIG. 5). These portions include the grill, the hood and cab of the truck 64. In one embodiment (not shown), the sheet 10 covers the door and/or the front quarter panels of the truck 64. The protective cover A shields these portions from the environment while allowing access to other portions of the truck 64 such as the bed and/or a tool/cargo container. As shown, the at least one bias member 32 attaches to a bed member of the truck 64. As such, at least one of the fastener assemblies 12 fastens the sheet 10 to the bed of the truck 64. In an embodiment, at least one bias member 32 may attach to the wheel well of the truck.

In another embodiment, the protective cover A covers portions of a vehicle V in the form of an automobile 66 (FIG. 6). These portions include the hood, window, windshield, trunk and sides of the automobile 66. As shown, the plurality of fastener assemblies 12 is positioned on the front 15, rear 16 and backsides 18 of the sheet 10. Furthermore, the front and rear fastener assemblies 12 include the bracket 48 fastened to the frame F at the license plate LP.

An adjustable connector 62 (FIG. 7), however, adjustably connects the rear side fastening assemblies 12 to each other when the rear 18 of the sheet 10 is positioned over the trunk of the vehicle V. In this configuration, the pair of rear side fastener assemblies 12 has elongated belts 28 without the bias member 32. Instead, the connector 62 directly fastens the opposing belts 28 together. As such, these fastener assemblies 12 do not attach to the frame F but instead connect to each other in order to maintain the sheet 10 against the automobile 66.

The rear fastener assembly 12 positioned on the rear 18 of the sheet 10, meanwhile, connects with the rear bracket 48 (FIG. 7). Additionally, the rear fastener assembly 12 includes a loop 68 wherein the adjustable connector 62 and the belts 28 of the pair of rear side fastener assemblies 12 pass through the loop 68. FIG. 8 illustrates a detail view of this assembly. The loop 68 positions and maintains the portions of the belts 28 across the rear portion of the truck 64.

Returning to FIG. 6, the user installs the bracket 48 of at least one of the fastener assemblies 12 to the frame F via the license plate LP. The user may install the brakes 48 to the license plate LP in a variety of ways. For example, the user may install the bracket 48 at the top or bottom of the license plate LP. The user then easily fastens the fastener connector 30 to the bracket 48 as previously discussed. The bracket 48 and/or combination of the bracket 48 and fastener connector 30 present a minimal visual impact for the vehicle V. Further, the position of the bracket 48 and fastener connector 30 allows an unhindered view of the license plate indicia.

Next, the user spreads the sheet 10 over portions of the vehicle V. Once positioned on the vehicle portions, the user extends the belts 28 of the fastener assemblies 12 to position the fastener connectors 30 in engagement with the respective bias members 32. As such, the plurality of fastener assemblies 12 fastens the sheet 10 to the frame F of the vehicle V with minimal effort.

With the sheet spread over the automobile portions, the tension assemblies 14 are positioned over the front and rear side of the automobile 66. The user then connects the opposing sheet members by the connector 62 of the tension assemblies 14. Based on the tightness of the sheet 10 against the vehicle V portion, the user then adjusts the belt 60 of the tension assemblies 14 via the connector 62 in order to move the tension sheet members 58, thereby adjusting the tension of the sheet 10 when the sheet 10 is attached to the frame F by the plurality of fastener assemblies 12.

The user then extends the elongated belts 28 of the rear side fastener assemblies 12 around the back quarter panels and across the back portion of the automobile 66. The user inserts one of the elongated belts 28 and adjustable connector 62 through the loop 68 of the rear fastening assembly 12. The user then mates the elongated belt 28 of the rear side fastener assemblies 12 while adjusting the lengths of the elongated belts 28 in order to maintain the belts 28 against the rear portion of the sheet 10. As shown in FIG. 7, the rear side fastener assemblies 12 and rear fastener assembly 12 maintains and fastens the sheet 10 to the frame F of the vehicle V. In this position, the indicia of the license plate LP is still visible to the viewer.

Figure 6A:
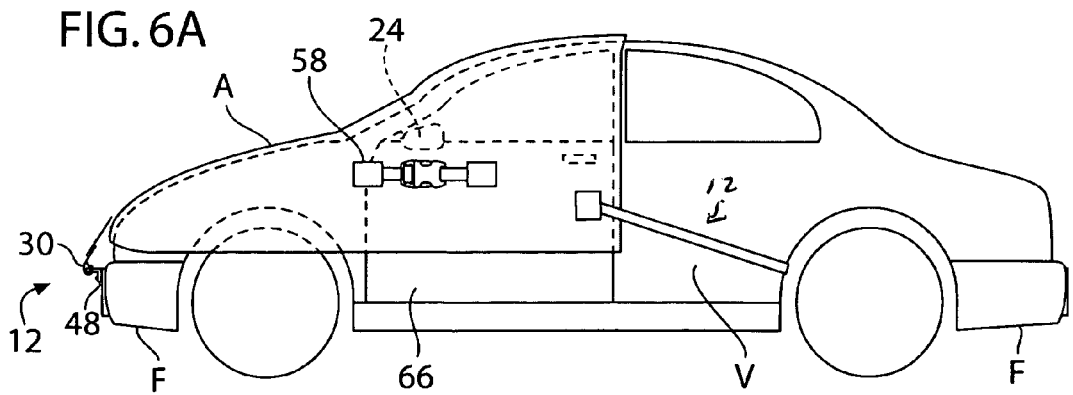
FIG. 6A is a side elevational view of the protective cover constructed in accordance with and embodying the present disclosure showing the protective cover fastened to the frame of the vehicle while covering a front portion of the vehicle.

Referring to FIG. 6A, another embodiment of the cover A covers portions of the vehicle V in the form of an automobile. In this embodiment, the covered portions include the hood, windshield, front window and front sides as shown. In this embodiment, the fastener assembly 12 may connect with the wheel well.

In view of the above, it will be seen that the several objects of the disclosure are achieved and other advantageous results are obtained. As various changes could be made in the above constructions without departing from the scope of the disclosure, it is intended that all matter contained in the above description or shown in the accompanying drawings shall be interpreted as illustrative and not in a limiting sense.

The invention claimed is:

1. A protective cover which fastens to a frame of a vehicle while covering portions of the vehicle, the cover, comprising:
   a sheet having substantially the general dimensions of the vehicle portions, the sheet having a front, a rear and sides which cover the portions of the vehicle;
   a plurality of fastener assemblies attached to the sheet, each fastener assembly having a fastener sheet member, a fastener connector and a bias member such that the fastener sheet member is integrally formed with the sheet, the bias member removably fastens to the frame of the vehicle and the fastener connector connects the fastener sheet member to the bias member in order to fasten the sheet to the frame of the vehicle; and
   a plurality of tension assemblies attached to the sheet, each tension assembly having opposing tension sheet members and a connector wherein the connector adjustably connects the tension sheet members in order to reciprocally move the tension sheet members thereby adjusting the tension of the sheet when the sheet is attached to the frame by the plurality of fastener assemblies.

2. The protective cover of claim 1 wherein the portions of the vehicle comprise a grid, a hood and a cab.

3. The protective cover of claim 1 wherein the portions of the vehicle comprise side-view mirrors and doors such that the sides of the sheet are configured to partially cover side-view mirrors and doors of the vehicle.

4. The protective cover of claim 3 wherein tension assemblies of the plurality of tension assemblies are attached to the sides of the sheet at adjacent positions the side-view mirrors.

5. The protective cover of claim 1 wherein the plurality of tension members is attached to the rear of the sheet.

6. The protective cover of claim 1 wherein the bias member of at least one of the fastener assemblies removeably connects to a cargo container of the vehicle.

7. The protective cover of claim 1 wherein the bias member of at least one of the fastener assemblies removeably connects with a bed member of the vehicle.

8. The protective cover of claim 1 wherein at least one of the fastener assemblies further comprises a bracket that is configured to removeably attach to the frame, the bracket having an L-shaped member.

9. The protective cover of claim 8 wherein the fastener connector of at least one of the fastener assemblies removeably attaches to the L-shaped member.

10. The protective cover of claim 9 wherein the bracket removeably attaches to a license plate member of the frame of the vehicle such that the bracket positions the sheet to expose the license plate member.

11. The protective cover of claim 10 wherein a pair of fastener assemblies are positioned on the rear of the sheet and are adjustably connected to each other by an adjustable connector when the rear of the sheet is positioned over a trunk of the vehicle.

12. The protective cover of claim 11 wherein at least one of the fastener assemblies includes a loop defined therethrough wherein the adjustable connector of the pair of fastener assemblies is configured to pass through the loop of the at least one fastener assembly.

13. The protective cover of claim 1 wherein a pair of fastener assemblies are positioned on the rear of the sheet and are adjustably connected to each other by an adjustable connector when the rear of the sheet is positioned over a trunk of the vehicle.

\* \* \* \* \*